US009520065B2

(12) United States Patent
Aymeric et al.

(10) Patent No.: US 9,520,065 B2
(45) Date of Patent: Dec. 13, 2016

(54) NAVIGATION AID INFORMATION DISPLAY DEVICE OF AN AIRCRAFT AND PRIMARY FLIGHT DISPLAY FOR AN AIRCRAFT

(71) Applicant: THALES, Neuilly sur Seine (FR)

(72) Inventors: Bruno Aymeric, Le Haillan (FR); Xavier Servantie, Le Haillan (FR); Cécile Andre, Le Haillan (FR)

(73) Assignee: THALES, Neuilly sur Seine (FR)

( * ) Notice: Subject to any disclaimer, the term of this patent is extended or adjusted under 35 U.S.C. 154(b) by 261 days.

(21) Appl. No.: 14/492,864

(22) Filed: Sep. 22, 2014

(65) Prior Publication Data
US 2015/0084794 A1 Mar. 26, 2015

(30) Foreign Application Priority Data
Sep. 20, 2013 (FR) ...................................... 13 02194

(51) Int. Cl.
*G01C 5/00* (2006.01)
*G01C 23/00* (2006.01)
*G01D 7/04* (2006.01)
*G08G 5/00* (2006.01)

(52) U.S. Cl.
CPC ............. *G08G 5/0047* (2013.01); *G01C 5/005* (2013.01); *G01C 23/00* (2013.01); *G01D 7/04* (2013.01)

(58) Field of Classification Search
CPC ......... G01C 23/00; G01C 23/005; G01D 7/00; G01S 13/9303; G01S 7/06; G01S 7/062; G01S 7/22; G08G 5/0021; G08G 5/0078; G08G 5/0086; G08G 5/0091; G04G 21/02; G06F 2207/5523; G06F 7/552

USPC .............. 340/945, 961, 971, 973, 974, 975
See application file for complete search history.

(56) References Cited

U.S. PATENT DOCUMENTS

| 2,717,378 A | | 9/1955 | Wimberly et al. |
|---|---|---|---|
| 3,958,108 A | * | 5/1976 | Shimomura ............ G06F 7/552 73/384 |
| 4,346,288 A | * | 8/1982 | Foster .................. G06G 1/0063 235/70 A |

(Continued)

FOREIGN PATENT DOCUMENTS

| EP | 2568256 A2 | 3/2013 |
|---|---|---|
| FR | 2801966 A1 | 6/2001 |

OTHER PUBLICATIONS

Search Report dated Jun. 27, 2014 for French Patent Application No. 1302194 filed on Sep. 20, 2013.

*Primary Examiner* — Fekadeselassie Girma
(74) *Attorney, Agent, or Firm* — Knobbe, Martens, Olson & Bear, LLP

(57) ABSTRACT

A navigation aid information display device of an aircraft and primary flight display for an aircraft are disclosed. In one aspect, the navigation aid information display system includes a display screen including at least one first display area configured to display a first altitude scale including graduations, the current altitude of the aircraft on the first scale, and set altitude value. The graduations of the first scale are distributed on an arc of a first disc including a first needle centered in the disc and the first needle is configured to indicate the current altitude on the first scale. The distribution of the graduations on the arc is nonlinear and symmetrical relative to a graduation corresponding to the set altitude value and defines extension graduations decreasing from the set altitude value.

15 Claims, 1 Drawing Sheet

(56) References Cited

U.S. PATENT DOCUMENTS

| | | | | |
|---|---|---|---|---|
| 4,860,007 A * | 8/1989 | Konicke | ............... | G01C 23/00 244/1 R |
| 4,914,733 A * | 4/1990 | Gralnick | ............... | G01C 23/00 340/961 |
| 5,412,382 A * | 5/1995 | Leard | ................... | G01C 23/005 340/973 |
| 5,844,504 A * | 12/1998 | Etherington | ........... | G01C 23/00 340/973 |
| 6,686,851 B1 * | 2/2004 | Gordon | ............... | G01C 23/005 340/970 |
| 6,690,299 B1 * | 2/2004 | Suiter | ................ | G01C 23/005 340/973 |
| 7,295,135 B2 * | 11/2007 | Younkin | ............... | G01C 23/00 340/946 |
| 7,412,308 B2 * | 8/2008 | Naimer | ................ | G01D 7/002 701/7 |
| 2002/0075171 A1 * | 6/2002 | Kuntman | ............... | G01C 23/00 340/961 |
| 2004/0113816 A1 * | 6/2004 | Maris | ....................... | G01D 7/00 340/971 |
| 2007/0005198 A1 * | 1/2007 | Maris | ....................... | G01D 7/00 701/14 |
| 2007/0182590 A1 * | 8/2007 | Younkin | ............... | G01C 23/00 340/973 |
| 2007/0183263 A1 * | 8/2007 | Matthey | ................ | G04G 21/02 368/11 |
| 2007/0236366 A1 * | 10/2007 | Gur | ........................ | G06K 9/00 340/945 |
| 2009/0121901 A1 * | 5/2009 | Namier | ................ | G01C 23/00 340/975 |
| 2012/0286975 A1 * | 11/2012 | Thomson | ............ | G08G 5/0021 340/974 |

* cited by examiner

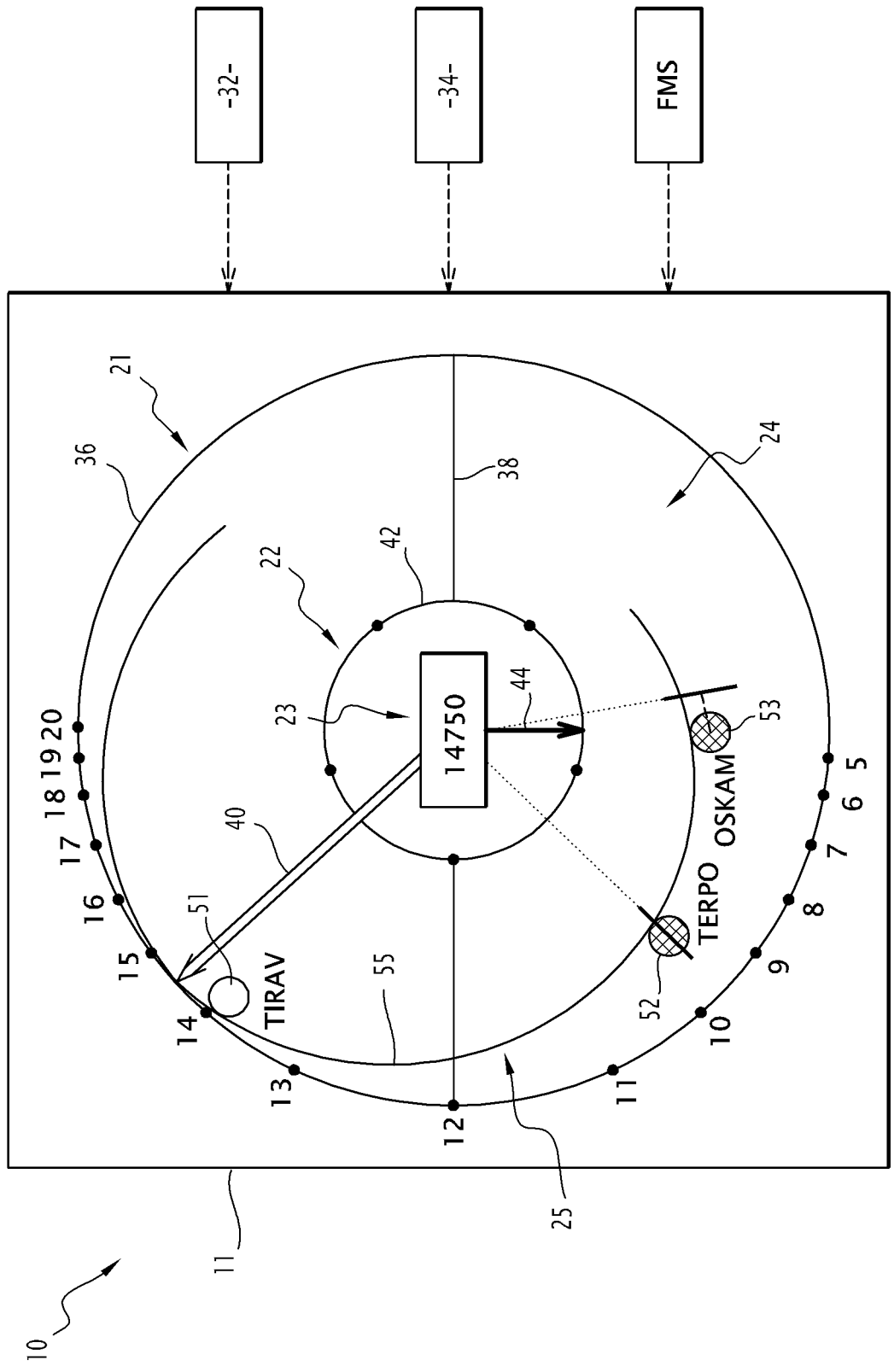

NAVIGATION AID INFORMATION DISPLAY DEVICE OF AN AIRCRAFT AND PRIMARY FLIGHT DISPLAY FOR AN AIRCRAFT

CROSS-REFERENCE TO RELATED APPLICATIONS

This application claims benefit under 35 U.S.C. §119 of French Application No. 13 02194, filed Sep. 20, 2013, which is herein incorporated by reference in its entirety.

BACKGROUND

1. Field

The described technology relates to a system for displaying navigation aid information of an aircraft.

More particularly, the described technology relates to such a system for displaying navigation aid information of an aircraft, of the type comprising a display screen including at least one first display area further allowing the display of:
  a first altitude scale including graduations;
  the current altitude of the aircraft on the first scale;
  a set altitude value.

The described technology also relates to a primary flight display of an aircraft.

2. Description of the Related Technology

The field of piloting and more particularly tracking of the altitude of an aircraft has multiple links with characteristic altitudes.

Among these characteristic altitudes, mention may for example be made of the altitude selected by the flight plan, the altitudes for reducing thrust, the altitude constraints on the flight plan and other altitudes.

During a flight, the vertical situation of the aircraft is generally monitored by the pilot. In addition to the current altitude of the aircraft, this vertical situation is relative to other diverse elements.

These elements for example comprise the flight plan inserted into the flight management system (FMS) and the vertical profile calculated by the system. The vertical profile, for example, takes into account altitude constraints on certain points. These constraints should be observed.

The elements of the vertical situation may also comprise the set altitude value, transmitted by air control. This set value takes precedence over all the other constraints which may have been integrated into the flight plan.

The elements of the vertical situation may also comprise information on the overflown ground. This element is not fundamental since the procedures followed during the flight and the instructions from air control are assumed to ensure separation of the aircraft and from the ground. However, for monitoring purposes (in particular in the event when an error or a fault occurs), the situation of the aircraft relative to the ground is certainly of interest.

Finally, the elements of the vertical situation may comprise the capabilities of ascent or descent of the aircraft. The available thrust of the engines sets the ascent capability. The requirement for maintaining a particular speed sets the capability of descent. Thus, observance or non-observance of a forced altitude may be anticipated as regards the ascent or descent gradient which the aircraft may actually support.

Various systems for displaying one or several of these elements exist in the state of the art.

Thus, for example, the display system integrated into the primary flight display (PFD) of many aircraft includes at least one altitude scale able to display the current altitude of this aircraft.

Such a scale is displayed vertically on the primary flight display and includes uniformly distributed graduations along this scale.

Generally, the scale is centered around the current altitude of the aircraft with a visible portion on the screen extending up to 1,000 ft. above and 1,000 ft. below this current altitude.

This visible portion therefore corresponds to the extension of the scale around the current altitude.

The display system is also capable of displaying on such a scale, certain other elements of the vertical situation of the aircraft, such as for example the set altitude value.

Thus, the set altitude value for example corresponds to a graduation of this scale indicated with a suitable indicator.

However, this solution has a certain number of drawbacks.

In particular, because of the relatively small extension of the scale, such a display system does not allow the display of a set altitude value if the latter is too far from the current altitude.

Notably, in the example shown below, the extension of the scale corresponds to 1,000 ft. and if the absolute value of the difference between the current altitude and the set altitude value is greater than 1,000 ft., the display system no longer allows the display of the set altitude value on the scale.

In this situation, even if the numerical value of the set altitude value generally remains visible on the primary screen, the absence of the corresponding indication on the scale does not allow the pilot to become aware, at a glance, if this set altitude value is far away from or close to the current altitude.

SUMMARY OF CERTAIN INVENTIVE ASPECTS

An object of certain inventive aspects is to find a remedy to these drawbacks.

For this purpose, an object of certain embodiments is a system for displaying navigation aid information of an aircraft, of the aforementioned type in which:
  the graduations of the first scale are distributed over an arc of a first disc including a first needle centered in this disc and intended to indicate the current altitude on the first scale, and
  the distribution of the graduations on the arc is non-linear and symmetrical relative to a graduation corresponding to the set altitude value and defines graduations with decreasing extensions from the latter.

According to a particular embodiment, the system includes one or several of the following features:
  the graduation corresponding to the set altitude value is located on the horizontal axis passing through the center of the first disc;
  the display screen includes a second display area allowing the display of a second altitude scale including graduations distributed on the periphery of a second disc, this second disc including a second needle intended to specify the indication of the first needle between two graduations of the first scale;
  the diameter of the second disc is less than the diameter of the first disc, and in that the second disc is placed at the center of the first disc;
  the display screen includes a third display area allowing the display of a number corresponding to the current altitude of the aircraft, inside the second disc;
  the difference between two neighboring graduations of the first scale and the complete revolution of the second needle in the second disc correspond to an altitude change of the aircraft of 1,000 ft.;

the display screen includes a fourth display area located between the first disc and the second disc and allowing the display of the way points of the trajectory provided by the flight plan of the aircraft from its current position, located at a horizontal distance of less than a predetermined visibility distance;

the visibility distance is equal to 10 Nm;

each way point is displayed on a radius of the first disc corresponding to the intended altitude for passing this point;

the radial distance between the first disc and the second disc represents the visibility distance;

the radial distance between the displayed point and the periphery of the first disc illustrates the horizontal distance between the aircraft and the way point;

the flight plan is provided by the flight management system (FMS) and includes information on the overflown ground;

the flight management system (FMS) is adapted so as to modify the display of a way point if a passage altitude constraint is a burden on this point;

the flight management system (FMS) is adapted so as to modify the display of a way point if the prediction of an actual trajectory of the aircraft is incompatible with a passage altitude constraint on this point;

the display screen includes a display area allowing display of the maximum capability of ascent of the aircraft from its current position;

the display screen includes a display area allowing display of the maximum capability of descent of the aircraft from its current position; and the capability is computed by the flight management system (FMS).

An object of certain embodiments is also a primary flight display of an aircraft including a display system as described above.

BRIEF DESCRIPTION OF THE DRAWINGS

The described technology will be better understood upon reading the description which follows, only given as an example and made with reference to the appended drawing which represents a schematic view of a navigation aid information display system of an aircraft according to an embodiment.

FIG. 1 is a system for displaying navigation aid information of an aircraft according to an embodiment.

The display system is designated with the general reference 10 FIG. 1.

DETAILED DESCRIPTION OF PREFERRED EMBODIMENTS

The display system 10 includes a display screen 11, for example, integrated into a primary flight display PFD ("Primary Flight Display").

Such a PFD display is part of the cockpit of an aircraft and generally includes essential information used for the piloting and navigation of the aircraft.

Thus, this PFD display is, for example, placed in a central position in front of said or each pilot seat.

Indeed, for a cockpit of an aircraft including several pilot seats, a PFD display is placed in front of each pilot seat.

The display screen 11, for example, includes five display areas. These display areas are designated in the appended figure by the general references 21, 22, 23, 24 and 25.

The first three display areas 21, 22 and 23 allow the display of information related to the current vertical position of the aircraft.

This current vertical position is defined by, for example, the current altitude of the aircraft.

For this purpose, the system 10 is connected to means for measuring the altitude designated by the general reference 32 in this figure.

These means 32 are for example represented by an instrument capable of measuring the static pressure outside the aircraft and of comparing it with a reference pressure.

Of course any other system may be contemplated.

The current vertical position of the aircraft is also defined by a set altitude value.

This set altitude value is for example transmitted by air control and should be imperatively observed by the pilot.

For this purpose, the system 10 is connected to means for providing the set altitude value designated by the general reference 34 in this figure.

These means 34 for example allow the pilot or the copilot to manually introduce into the flight management system of the aircraft, a set altitude value received from air control through radio-communication means.

More specifically, the first display area 21 is capable of displaying the current altitude on a first altitude scale including graduations.

The graduations are distributed on an arc of a first disc designated by the general reference 36 in the figure. The increasing order of these graduations corresponds to the clockwise direction of the disc 36.

The length of the arc is for example greater than the length of the half-circle corresponding to the disc 36.

The difference between two neighboring graduations of the first scale for example corresponds to an altitude change of the aircraft of 1,000 ft.

Thus, in the figure, each graduation corresponds to a number ranging from "5" to "20". Each number therefore corresponds to the number of thousands contained in an altitude measured in feet (ft.).

The graduation corresponding to the set altitude value is located for example on the horizontal axis passing through the center of the first disc 36. This axis is designated by the general reference 38 in the figure.

The first scale is therefore a dynamic scale and able to change with a change in the set altitude value.

In the figure, the graduation corresponding to the number "12" is located on the axis 38 and the set altitude value is equal to 12,000 ft.

The distribution of the graduations on the arc of the first disc 36 is nonlinear.

Moreover it is symmetrical relative to the corresponding graduation at the set altitude value and defines decreasing extension graduations from the latter.

Thus, in FIG. 1, two segments between the graduations corresponding to the numbers "13" and "12" and to the numbers "12" and "11" are maximum extension segments.

The decrease in the length of the segments is for example defined by a logarithmic law.

The first disc 36 includes a first needle designated by the general reference 40 in the figure.

The first needle 40 is centered in the disc 36 and is intended to indicate the current altitude of the aircraft on the first scale.

Thus, in the figure, the first needle 40 indicates the current altitude comprised between 14,000 ft. and 15,000 ft.

This indication of the first needle 40 is able to be specified by information contained in the second display area 22.

Thus, the second display area allows for the display of a second altitude scale.

This second scale, for example, includes five graduations, one of which is located on the horizontal axis 38.

The graduations are uniformly distributed over the periphery of a second disc, designated by the general reference 42 in FIG. 3.

This second disc 42 is for example placed in the center of the first disc 36 and its diameter is less than that of the first disc 36.

The difference between two neighboring graduations of the second scale for example corresponds to a change in altitude of the aircraft of 200 ft.

The second disc 42 includes a second needle designated by the general reference 44 in the figure.

This needle 44 is centered in the disc 42 and intended to specify the indication of the first needle 40 between two neighboring graduations of the first scale.

Thus, one complete revolution of the second needle 44 for example corresponds to a change in altitude of the aircraft of 1,000 ft.

The position of the second needle 44 indicating the graduation located on the horizontal axis 38 corresponds to the position of the first needle 40 specifically indicating a graduation of the first scale.

In other words, this graduation located on the horizontal axis 38 is the reference point. The direction of rotation of the needle 44 is for example clockwise.

Thus, the vertical position of the needle 44 oriented downwards in the figure corresponds to the value of 750 ft.

By taking into account the position of the first needle 40 between the numbers "14" and "15", the conclusion may be drawn that the current altitude of the aircraft is equal to 14,750 ft. (14,000+750).

The exact value corresponds to the current altitude of the aircraft and is moreover displayed in the third display area 23.

This display area 23 is for example located in the inner portion of the second disc 42 and is for example formed by an alpha-numerical display.

The fourth display area 24 allows for the display of information predicting the vertical position of the aircraft.

This information for example includes way points of the trajectory provided by the flight plan of the aircraft.

The flight plan is for example provided by the flight management system FMS.

For this purpose, the system 10 is conventionally connected to the FMS system as this is illustrated in the figure.

More specifically, the fourth display area 24 gives the possibility of displaying way points located at a horizontal distance of less than a predetermined visibility distance and computed from the current position of the aircraft.

The radial distance between the first disc 36 and the second disc 42 represents the visibility distance.

This predetermined visibility distance is for example equal to 10 Nm.

This travel path is displayed in the form of a circular pad placed on a radius of the first disc 36 corresponding to the passage altitude provided by the flight plan in this point.

Each way point is displayed with a name corresponding to the name of this way point on the flight plan.

Further, each way point is displayed on the corresponding radius so that the radial distance between this displayed point and the periphery of the first disc 36 represents the horizontal distance between the aircraft and this way point.

Thus, for example, the fourth display area 24 illustrated in the figure includes three way points with the names in the flight plan of "TIRAV", "TERPO" and "OSKAM" and are respectively designated by the general references 51, 52 and 53 in this figure.

The point 51 is placed on a radius of the first disc approximately corresponding to the altitude of 14,000 ft., the point 52 on a radius approximately corresponding to the altitude of 9,500 ft. and the point 53 on a radius corresponding approximately to the altitude of 4,500 ft.

In this figure, the closest way point to the current position of the aircraft is the point 51 with a horizontal distance approximately equal to 1 Nm.

It should be noted that the system 10 has the purpose of only showing visually the distance as far as a way point and the altitude of this point without providing exact values.

The fourth display area 24 also gives the possibility for example of showing in connection with display of the way points, certain possible passage restrictions.

These passage restrictions for example represent a minimum passage altitude or other restrictions being a burden on this way point and relating to the overflown ground.

Alternatively, a way point may include constraints on the passage speed.

Such constraints for example stem from the flight plan and are provided to the system 10 for example by the FMS system.

Further, the FMS system is able to compare the prediction of the actual trajectory of the aircraft with these passage constraints and in the case of inobservance of these constraints, to modify the display of the corresponding way point.

Thus, for example, a way point with an observed passage altitude constraint is displayed with a line crossing this point and oriented along the corresponding radius. A way point with an unobserved passage altitude constraint is for example displayed with a line away from this point.

In the figure, the actual passage altitude constant in point 52 is observed and in point 53 this constraint is not observed.

In particular, in this figure, the radius corresponding to the point 53, represents the constraint altitude and the radius corresponding to the line, represents the intended passage altitude. The point 53 is therefore located on the left of the corresponding line. This means that the altitude of the point is greater than that of the line.

The fifth display area 25 allows for the display of information relating to technical restrictions of the aircraft for changing its vertical position.

This information for example includes maximum ascent and descent capabilities of the aircraft from the current position.

The maximum capabilities are provided and/or computed by a computer of the aircraft and for example integrated into the flight management system FMS.

More specifically, the fifth display area 25 allows for the display of a curve corresponding to the maximum ascent and descent capabilities of the aircraft. This curve is designated by the general reference 55 in the figure.

This curve 55 is able to delimit a set of points which are accessible from the current position of the aircraft.

Thus, in the figure, the portion of the curve 55 extending from the end of the first needle 40 in the clockwise direction shows the maximum ascent capability of the aircraft. Thus, the set of points located between this curve and the second disc 42 is accessible for the aircraft if the latter ascends from the current position.

Similarly, the portion of the curve 55 extending from the end of the first needle 40 in the anti-clockwise direction shows the maximum descent capability of the aircraft. Thus, the set of points located between this curve and the second disc 42 is accessible for the aircraft if the latter descends from the current position.

The flight management system FMS is moreover capable of modifying the display of a way point if this point is inaccessible by taking into account the actual maximum ascent and descent capabilities of the aircraft from the current position.

In the figure, the point 51 is accessible and is displayed by a simple circular pad. The points 52 and 53 are inaccessible and are displayed with hatched circular pads.

Of course, other embodiments and other ways of showing these different pieces of information may further be contemplated.

One particular advantage of certain embodiments relates to the possibility of displaying the current altitude in the form of rotating needles while keeping the possibility of displaying other elements related to the vertical position of the aircraft, as notably the set altitude value.

The rotating needles allow the pilot to visually monitor the change in the vertical speed of the aircraft as this was the case in the old round altimeters.

Another advantage of certain embodiments relates to the possibility of using such a display system with a touch screen.

In particular, a touch screen will allow the pilot to touch a particular altitude value (for example "10" in the figure).

The system may therefore interpret this as a request for information relating to the altitude of 10,000 ft. The FMS may then provide various pieces of information related to this altitude (for example distance/time for reaching 10,000 ft. with the present assumptions, with the maximum performances, by extracting the airbrakes, etc.).

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A system for displaying information for navigational aid of an aircraft, comprising:
a display screen including at least one first display area configured to display:
a first altitude scale including graduations; the current altitude of the aircraft on the first scale; and
a set altitude value, wherein the graduations of the first scale are distributed on an arc of a first disc including a first needle centered in the disc, the first needle configured to indicate the current altitude on the first scale, wherein the distribution of the graduations on the arc is nonlinear and symmetrical relative to a graduation corresponding to the set altitude value and defines extension graduations decreasing from the set altitude value, and
wherein the display screen includes a second display area configured to display a second altitude scale including graduations distributed on the periphery of a second disc, the second disc including a second needle configured to indicate the value of the first needle between two graduations of the first scale.

2. The system of claim 1, wherein the graduation corresponding to the set altitude value is located on the horizontal axis passing through the center of the first disc.

3. The system of claim 1, wherein the diameter of the second disc is less than the diameter of the first disc and wherein the second disc is placed at the center of the first disc.

4. The system of claim 1, wherein the display screen includes a third display area configured to display a number corresponding to the current altitude of the aircraft, inside the second disc.

5. The system of claims 1, wherein the difference between two neighboring graduations of the first scale and the complete revolution of the second needle in the second disc correspond to a change in altitude of the aircraft of 1,000 ft.

6. The system of claim 1, wherein the display screen includes a fourth display area located between the first disc and the second disc and configured to display way points of the trajectory provided by the flight plan of the aircraft from its current position, located at a horizontal distance of less than a predetermined visibility distance.

7. The system of claim 6, wherein the predetermined visibility distance is 10 Nm.

8. The system of claim 6, wherein:
each way point is displayed on a radius of the first disc corresponding to the intended passage altitude at the way point;
the radial distance between the first disc and the second disc represents the predetermined visibility distance; and
the radial distance between the displayed way point and the periphery of the first disc represents the horizontal distance between the aircraft and the way point.

9. The system of claim 6, wherein the flight plan is provided by a flight management system (FMS) and includes information on the overflown ground.

10. The system of claim 9, wherein the flight management system (FMS) is adapted so as to modify the display of a way point if a passage altitude constraint is a burden on the way point.

11. The system of claim 10, wherein the flight management system (FMS) is adapted so as to modify the display of a way point if the prediction of an actual trajectory of the aircraft is incompatible with a passage altitude constraint in the way point.

12. The system of claim 1, wherein the display screen includes a display area configured to display the maximum ascent capability of the aircraft from its current position.

13. The system of claim 1, wherein the display screen includes a display area configured to display the maximum descent capability of the aircraft from its current position.

14. The system of claim 12, wherein the flight management system (FMS) is configured to compute the maximum ascent capability.

15. A primary flight display (PFD) of an aircraft, comprising:

a display screen including at least one first display area configured to display;

a first altitude scale including graduations; the current altitude of the aircraft on the first scale; and a set altitude value, wherein the graduations of the first scale are distributed on an arc of a first disc including a first needle centered in the disc, the first needle configured to indicate the current altitude on the first scale, wherein the distribution of the graduations on the arc is nonlinear and symmetrical relative to a graduation corresponding to the set altitude value and defines extension graduations decreasing from the set altitude value, and wherein the display screen includes a second display area configured to display a second altitude scale including graduations distributed on the periphery of a second disc, the second disc including a second needle configured to indicate the value of the first needle between two graduations of the first scale.

* * * * *